(No Model.)
L. F. WRIGHT.
COMBINED RATCHET DRILL, BRACE, AND BREAST DRILL.
No. 452,589. Patented May 19, 1891.
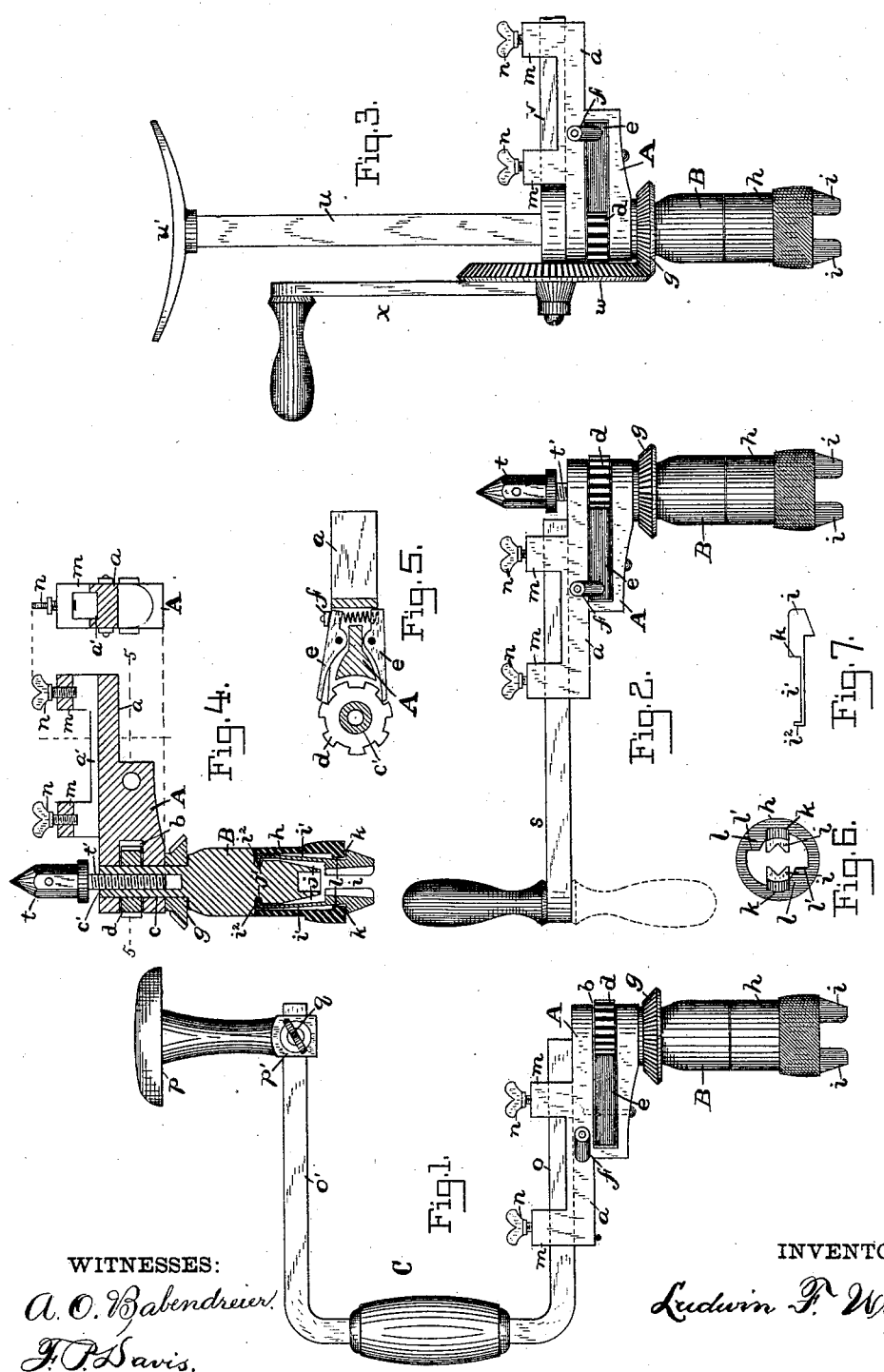
WITNESSES:
A. O. Babendreier
F. P. Davis.
INVENTOR:
Ludwin F. Wright,
BY Chas B. Mann
ATTORNEY.

UNITED STATES PATENT OFFICE.

LUDWIN F. WRIGHT, OF BALTIMORE, MARYLAND.

COMBINED RATCHET-DRILL, BRACE, AND BREAST-DRILL.

SPECIFICATION forming part of Letters Patent No. 452,589, dated May 19, 1891.

Application filed February 10, 1891. Serial No. 380,933. (No model.)

*To all whom it may concern:*

Be it known that I, LUDWIN F. WRIGHT, a citizen of the United States, residing at Baltimore, in the State of Maryland, have invented certain new and useful Improvements in Combined Ratchet-Drills, Braces, and Breast-Drills, of which the following is a specification.

This invention relates to a combination-tool which comprises a ratchet-drill, a brace, and a breast-drill, the object being to provide an arrangement of parts whereby the tool can be readily converted from one form into another, and in every instance will be strong, compact, and easy to use.

A further object is to provide an improved chuck for holding the bit.

With these ends in view my invention consists in certain features of construction and combinations of parts described hereinafter, and pointed out in the claims.

Referring to the accompanying drawings, illustrating the invention, Figure 1 represents a side elevation of the tool in the form of a brace for wood-boring; Fig. 2, a similar view showing it in the form of a ratchet-drill for metal-boring; Fig. 3, a corresponding view showing the tool as a breast-drill; Fig. 4, a central longitudinal section through the bit-stock; Fig. 5, a cross-section taken on the line 5 5 of Fig. 4; Fig. 6, an end view of the chuck for holding the bit, and Fig. 7 a detail of one of the spring-jaws of the chuck.

The letter A designates the stock, which is common to all three tools, and has a projecting arm $a$, a longitudinal recess $b$, and a transverse bore $c$.

The letter B designates the tool-spindle, which has a round hollow shank $c'$, fitting the bore $c$ of the stock and extending across the recess $b$. A ratchet-wheel $d$ is mounted rigidly on the shank $c'$ and occupies the said recess $b$. A pair of spring-pawls $e$ are pivoted on opposite sides of the stock A and engage said ratchet-wheel, and buttons $f$ are pivoted to the stock, one on each side, and when turned over the outer ends of the pawls $e$ release the latter from engagement with the ratchet-wheel and hold them clear of the same. A bevel-pinion $g$ is also mounted rigidly on the shank $c'$ of the spindle B, and the latter at its outer end is turned off to receive a sleeve $h$, which constitutes part of the chuck for holding the bit. The jaws $i$ of the chuck each have a thin flat shank $i'$, which is contained in a longitudinal recess or groove $j$ in the spindle B. The said shank fits flat upon the bottom of the groove at the inner portion of the same, and has a projection $i^2$ at its inner extremity which engages a depression $j'$ in the bottom of said groove to prevent the jaw from pulling out. The bottom of the outer portion of the groove is cut away on an incline toward the center of the spindle to allow room for the jaw to move inward against the bit. The sleeve $h$ fits over the shanks $i'$ of the jaws, and the latter have shoulders $k$, which take over the outer end or face of the said sleeve. The latter at its outer end has a pair of inward-extending flanges $l$ of increasing width, each of which extends halfway around the sleeve and terminates in a shoulder $l'$. This brings the widest portions of said flanges opposite each other. These flanges constitute cams, and it will be observed that by turning the sleeve $h$ they are caused to ride over the jaws $i$ and press them toward each other and against the bit. The sleeve $h$ fits close upon the shanks of the jaws, and the inner end of the said shanks will thus be held in by said sleeve while the jaws are contracted, and in this manner the shanks supply the spring of the jaws. When the jaws are pressed together, the inner ends of their spring-shanks will have a pressure against the inside surface of the sleeve, and thus will prevent the latter from turning loose.

The rear face of the stock A is provided with a longitudinal groove $a'$, and a pair of boxes $m$ project from the stock and span the said groove. One of these boxes is located at about the middle of the stock, and the other at the extremity of the arm $a$, and each have square openings through them and thumb-screws $n$, which enter said openings.

The letter C designates the crank of the brace, which has a square straight arm $o$ to extend through the boxes $m$ and engage the groove $a'$. The thumb-screws $n$ clamp the said arm $o$ to the stock. The opposite arm $o'$ of the crank is also square, and on it is mounted the swiveled bearing-knob $p$, which has a boss $p'$, with a square bore through which the arm $o'$ extends. A thumb-screw $q$ in said boss clamps the knob to the arm. It will be apparent that with this arrangement for clamping the crank to the stock and knob the said crank can be adjusted to have a greater or less sweep by sliding the arm $o$ through the boxes $m$, and fixing the knob $p$ on the arm $o'$ to correspond. The tool now constitutes a complete brace for wood-boring, which can also be used as a ratchet-brace by releasing one of the pawls $e$ from engagement with the ratchet-wheel $d$.

To convert the tool into a drill for boring in metal, the thumb-screws $n$ are turned to release the arm $o$, and the latter is drawn out from the boxes $m$. A straight handle $s$, Fig. 2, is substituted and clamped to the stock, and a center point $t$, having a threaded shank $t'$, is screwed into the inner end of the hollow shank $c'$ of the tool-spindle B. One of the pawls $e$ is released from engagement with the ratchet-wheel, according to the direction in which the boring is to be done, and it will be observed that we have a ratchet-drill which can be operated in the usual manner for boring in metal.

To produce a breast-drill, the handle $s$ is removed and an extra piece applied, which comprises a straight rod $u$, having on one end a curved breast-piece $u'$ and on the other a square arm $v$ at right angles, which is inserted through the boxes $m$ and clamped to the stock in the same manner as the crank of the brace and the handle of the ratchet-drill. The center point $t$ is removed in applying this extra piece, and the arm $v$ is inserted through the boxes $m$ from the butt-end of the stock. This arm $v$ projects on the opposite side of the rod $u$ and carries a bevel gear-wheel $w$, which meshes with the bevel-pinion $g$, keyed on the tool-spindle B. The said gear-wheel has a crank-handle $x$, by means of which it is revolved. Both pawls $e$ are released from engagement with the ratchet-wheel $d$, and it will be seen that the tool is converted into a breast-drill which is operated by turning the crank $x$. It will be observed that the projecting arm $a$ of the stock will now serve as a handle which can be grasped to steady the drill.

Having thus described my invention, what I claim as new, and desire to secure by Letters Patent, is—

1. The combination of a bit-stock having a transverse bore and a pair of boxes on its rear side provided with openings through them and clamping-screws entering said openings, a tool-spindle engaging the said transverse bore of the stock and carrying a ratchet-wheel and a bit-chuck at its outer end, pawls to engage said ratchet-wheel, and a handle-piece having an arm to extend through the said boxes on the rear side of the bit-stock and adapted to be adjustably clamped therein by the said clamping-screws, in the manner set forth.

2. The combination of a bit-stock having a transverse bore, a longitudinal groove in its rear side, and a pair of boxes over said groove, provided with openings through them and clamping-screws entering said openings, a tool-spindle engaging the said transverse bore in the stock and carrying a ratchet-wheel and a bit-chuck at its outer end, pawls to engage said ratchet-wheel, and a handle-piece having an arm to extend through the said boxes on the rear side of the bit-stock and engage the said longitudinal groove and adapted to be adjustably clamped therein by the said clamping-screws, in the manner set forth.

3. The combination of a bit-stock having a transverse bore and a pair of boxes on its rear side provided with openings through them and clamping-screws entering said openings, a tool-spindle engaging the said transverse bore of the stock and carrying a ratchet-wheel and a bit-chuck at its outer end, a spring-actuated pawl pivoted on each side of the bit-stock to engage said ratchet-wheel, a button on each side of the stock adapted to be turned over said pawls to release them from the ratchet-wheel, and a handle-piece having a straight arm to extend through the said boxes on the rear side of the bit-stock and adapted to be adjustably clamped therein by the said clamping-screws, in the manner set forth.

4. The combination of a bit-stock having a transverse bore and a pair of boxes on its rear side provided with openings through them and clamping-screws entering said openings, a tool-spindle having a hollow shank engaging the said transverse bore of the stock and carrying a ratchet-wheel and a bit-chuck at its outer end, pawls to engage said ratchet-wheel, a center point to fit in the said hollow shank of the tool-spindle, and a handle-piece having an arm to extend through the said boxes on the rear side of the bit-stock and adapted to be adjustably clamped therein by the said clamping-screws, in the manner set forth.

5. The combination of a bit-stock having a transverse bore and a pair of boxes on its rear side provided with openings through them and clamping-screws entering said openings, a tool-spindle engaging the said transverse bore of the stock and carrying a ratchet-wheel and a bit-chuck at its outer end, pawls to engage said ratchet-wheel, a handle-piece having an arm to extend through the said boxes on the rear side of the bit-stock and adapted to be adjustably clamped therein by the said clamping-screws, and an adjustable bearing-knob, as set forth.

6. The combination of a bit-stock having a transverse bore and a pair of boxes on its rear side provided with openings through them and clamping-screws entering said openings, a tool-spindle engaging the said transverse bore of the stock and carrying a bevel-pinion and a bit-chuck at its outer end, and a handle-piece having a straight arm to extend through the said boxes on the rear side of the bit-stock and adapted to be clamped therein by said clamping-screws, said handle-piece carrying a bevel gear-wheel to mesh with the bevel-pinion on the tool-spindle, as set forth.

7. The combination of a bit-stock having a projecting arm, a transverse bore, and a pair of boxes on its rear side provided with openings through them and clamping-screws entering said openings, one of said boxes being located at the outer end of said projecting arm, a tool-spindle engaging the said transverse bore of the stock and carrying a bevel-pinion and a bit-chuck at its outer end, and a handle-piece having a straight arm extending through the said boxes on the rear side of the bit-stock and adapted to be clamped therein by said clamping-screws, said handle-piece carrying a bevel gear-wheel to mesh with the bevel-pinion on the tool-spindle, as set forth.

8. In a chuck, the combination of a tool-spindle having longitudinal recesses in two opposite sides thereof, a pair of jaws projecting from the outer end of said spindle and having spring-shanks contained in said longitudinal recesses, and a loose sleeve on the spindle, confining the said spring shanks of the jaws and having at its outer end inward-extending cam-flanges to ride over the jaws and contract them, as set forth.

9. In a chuck, the combination of a tool-spindle having longitudinal recesses in two opposite sides thereof, a pair of jaws projecting from the outer end of said spindle and having spring-shanks contained in said longitudinal recesses and shoulders at their outer ends, and a loose sleeve on the spindle, confining the said spring-shanks of the jaws and having at its outer end inward-extending cam-flanges to ride over the jaws and contract them, the outer face of the said sleeve fitting behind the shoulders on the jaws, as set forth.

10. In a chuck, the combination of a tool-spindle having longitudinal recesses in two opposite sides thereof, the bottoms of said recesses sloping toward the center of the spindle at the outer end of the latter, a pair of jaws projecting from the outer end of said spindle and having spring-shanks contained in said longitudinal recesses, and a loose sleeve on the spindle, confining the said spring-shanks of the jaws and having at its outer end inward-extending cam-flanges to ride over the jaws and contract them, as set forth.

In testimony whereof I affix my signature in the presence of two witnesses.

LUDWIN F. WRIGHT.

Witnesses:
F. P. DAVIS,
JNO. T. MADDOX.